US006795940B2

United States Patent
Goto

(10) Patent No.: US 6,795,940 B2
(45) Date of Patent: Sep. 21, 2004

(54) METHOD OF AND APPARATUS FOR EXECUTING DIAGNOSTIC TESTING OF A ROM

(75) Inventor: Kenichi Goto, Yamato (JP)

(73) Assignee: Nissan Motor Co., Ltd., Yokohama (JP)

( * ) Notice: Subject to any disclaimer, the term of this patent is extended or adjusted under 35 U.S.C. 154(b) by 553 days.

(21) Appl. No.: 09/953,892

(22) Filed: Sep. 18, 2001

(65) Prior Publication Data

US 2002/0049931 A1 Apr. 25, 2002

(30) Foreign Application Priority Data

Sep. 19, 2000 (JP) ........................................ 2000-284133

(51) Int. Cl.[7] .............................................. G06F 11/00
(52) U.S. Cl. ........................................................ 714/42
(58) Field of Search ........................... 714/5, 6, 41, 42, 714/49, 54; 701/31; 700/81

(56) References Cited

U.S. PATENT DOCUMENTS

| | | | | |
|---|---|---|---|---|
| 4,339,801 A | * | 7/1982 | Hosaka et al. | 701/102 |
| 4,908,792 A | * | 3/1990 | Przybyla et al. | 701/102 |
| 5,155,844 A | * | 10/1992 | Cheng et al. | 714/36 |
| 5,327,531 A | * | 7/1994 | Bealkowski et al. | 714/6 |
| 5,671,141 A | * | 9/1997 | Smith et al. | 701/29 |
| 6,009,541 A | * | 12/1999 | Liu et al. | 714/36 |
| 6,185,696 B1 | * | 2/2001 | Noll | 714/6 |
| 6,622,246 B1 | * | 9/2003 | Biondi | 713/100 |
| 6,718,486 B1 | * | 4/2004 | Roselli et al. | 714/41 |

FOREIGN PATENT DOCUMENTS

| | | |
|---|---|---|
| JP | 2000-66963 | 3/2000 |
| JP | 2000-123594 | 4/2000 |

* cited by examiner

Primary Examiner—Robert Beausoliel
Assistant Examiner—Gabriel Chu
(74) Attorney, Agent, or Firm—Foley & Lardner LLP

(57) ABSTRACT

The diagnostic testing of a ROM is executed by a ROM diagnostic testing apparatus in which an ordinary ROM diagnostic testing program and a high-speed ROM diagnostic testing program are prepared and stored in separate storing region of the ROM, and the ordinary ROM diagnostic testing program executes the diagnosing of the entire storing region of the ROM while the high-speed ROM diagnostic testing program executes one specified storing region of the ROM that concentratedly stores the OS, which is a JOB calling portion, the library, which is a general-purpose subroutine, the ordinary ROM diagnostic testing program, and the sum/parity of the program.

10 Claims, 4 Drawing Sheets

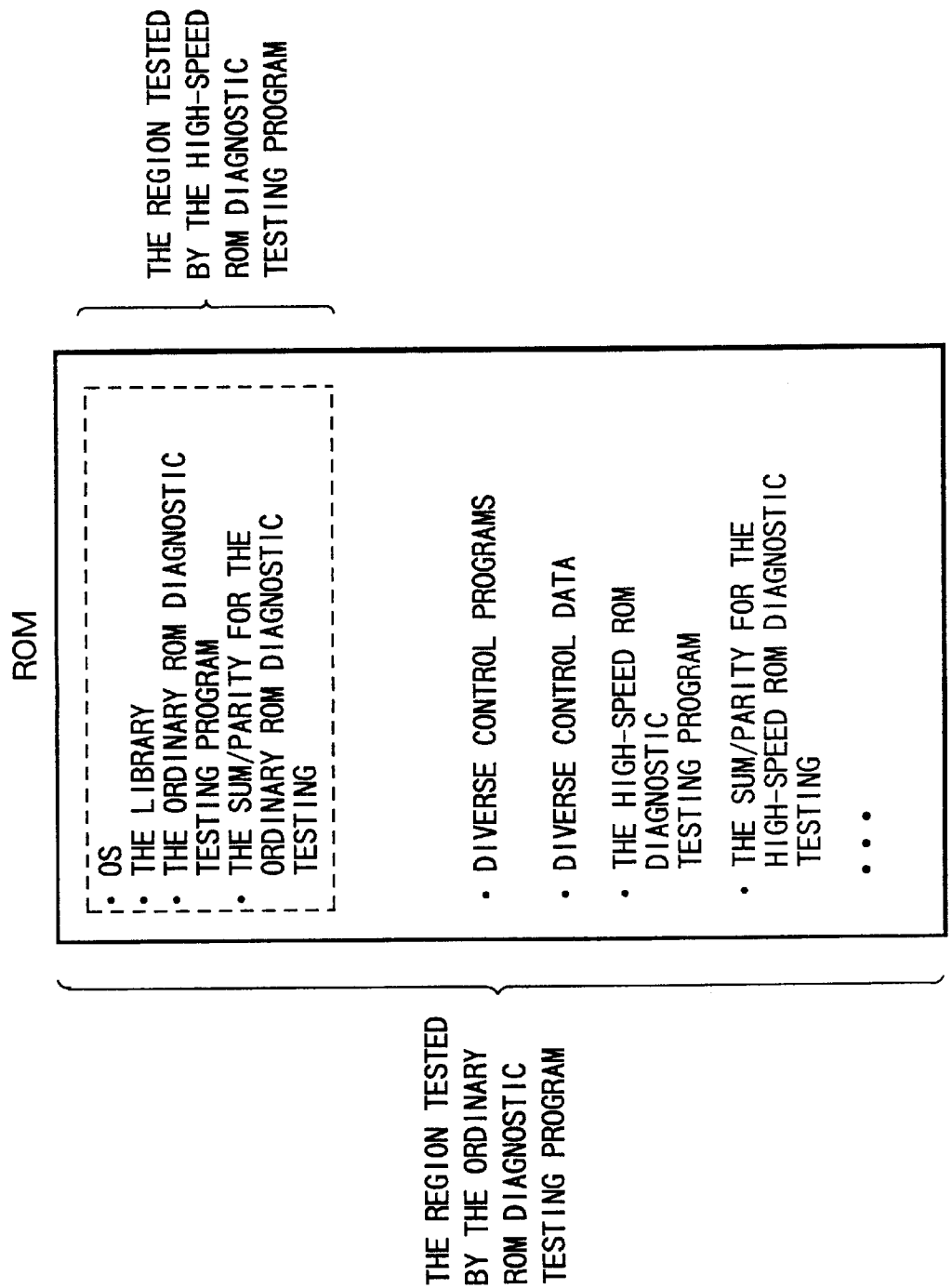

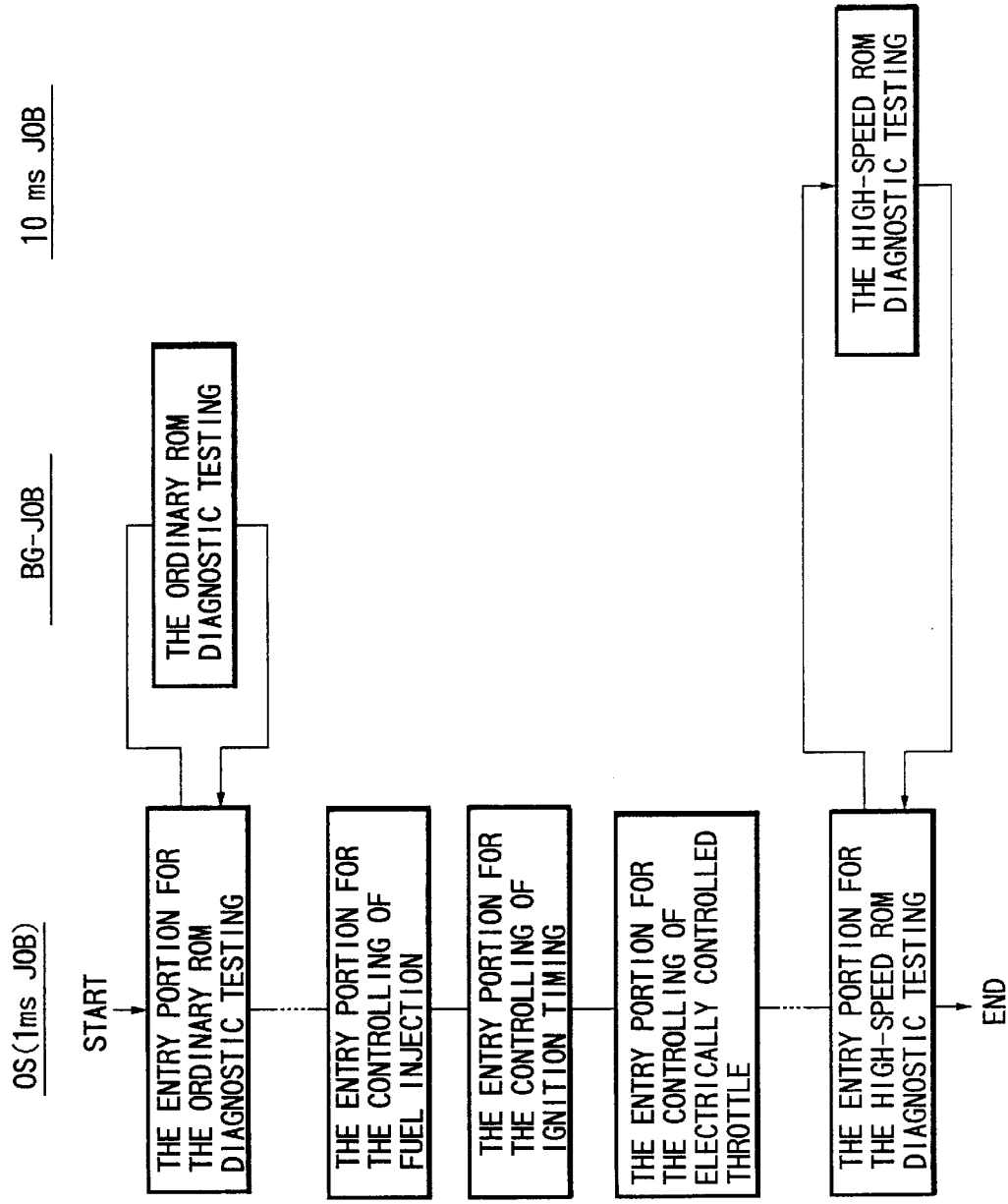

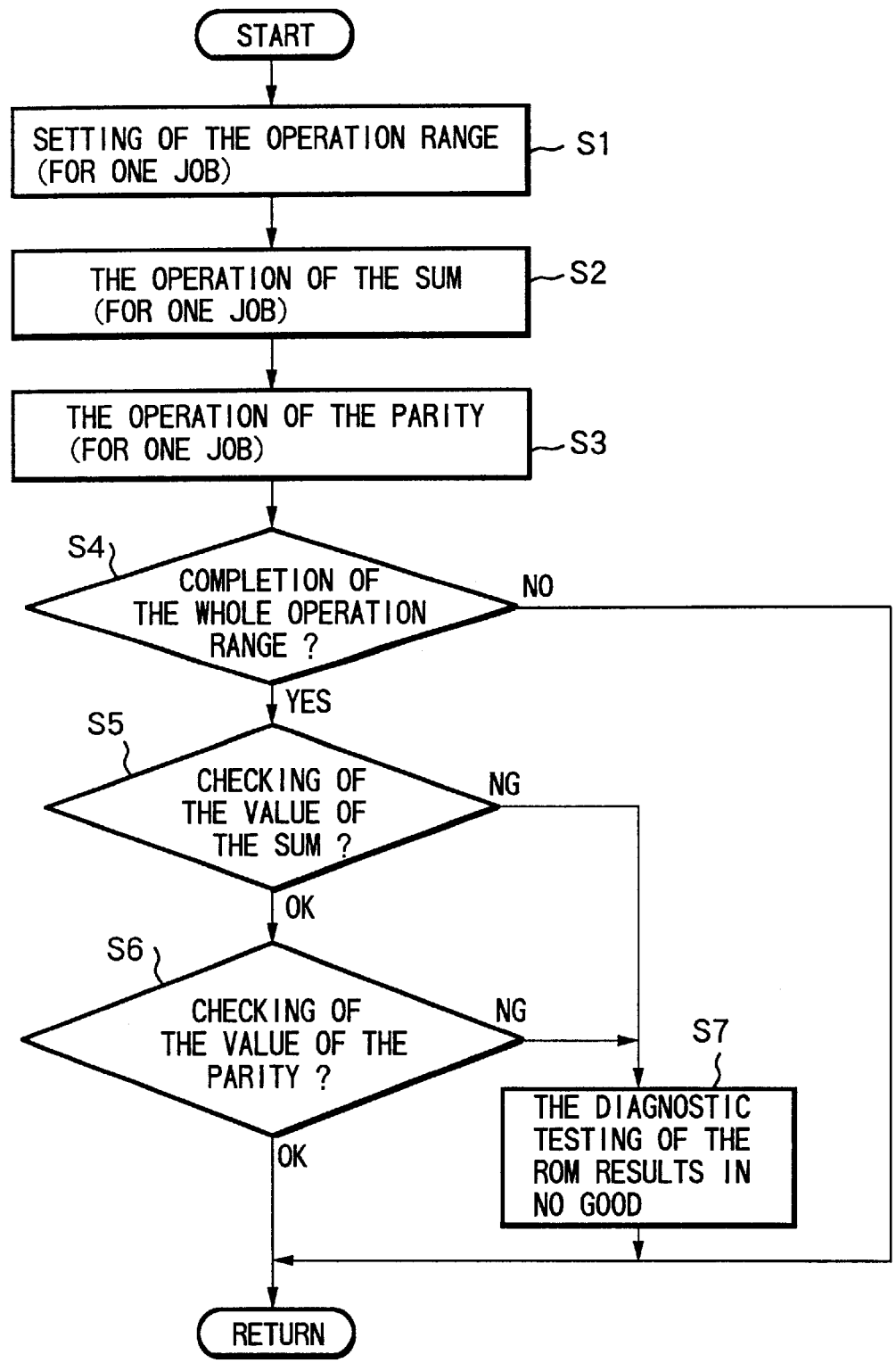

METHOD OF AND APPARATUS FOR EXECUTING DIAGNOSTIC TESTING OF A ROM

BACKGROUND OF THE INVENTION

The present invention relates to a method of and an apparatus for executing diagnostic testing of a ROM (Read Only Memory) assembled in a microcomputer used for controlling various kinds of electronic controllers of, for example, vehicles such as passenger cars and other industrial cars.

BACKGROUND INFORMATION

Heretofore, in the controlling microcomputers accommodated in various kinds of electronic controllers incorporated in car engines and transmissions of vehicles, diagnostic testing of the ROM assembled in the controlling microcomputer is carried out by the CPU (Central Processing Unit) of the same controlling microcomputers according to a testing program preliminary stored in the ROM to conduct diagnostic testing of any troubles, e.g., data volatilization, and damage, which might occur to the ROM. In this regard, Japanese Laid-open Patent Publications Nos. 2000-123594 and 2000-66963 should be referred to.

The diagnostic testing of the ROM is carried out in such a manner that the computation of the sum/parity is conducted in respect to the entire memory region of the ROM to compare the result of the computation with the sum/parity (expectation) that is preliminarily computed and stored within the ROM. When the comparison reveals that there is some discrepancy therebetween, it is notified that the ROM has some trouble rendering the ROM to be no good (NG) due to some trouble, and in turn the fail-safe process is executed.

On the other hand, with a controller for a vehicle, such as an electric controller for the throttle valve, which provides a direct affect on the maneuverability of the vehicle, it is absolutely necessary for detecting any ROM trouble during driving operation of it engine. Nevertheless, the diagnostic testing of the ROM trouble takes a rather long time, and therefore, the testing of the ROM trouble during driving operation of the engine might some adverse affect on the engine controlling function during the diagnostic testing.

Therefore, according to the technique disclosed in the above-mentioned Japanese Laid-open Patent Publication No. 2000-66963, the diagnostic testing of the ROM over the entire storing region thereof is continuously conducted at a high speed either before the start of the vehicle engine or at the moment of stopping of the vehicle engine on one hand, and on the other hand, a low speed testing of the ROM is intermittently conducted by interruption at a predetermined time cycle with each of the separated storing region of the ROM.

Nevertheless, as described above, the diagnostic testing of the ROM is conducted so as to detect any trouble within the ROM by using the testing program stored itself. Thus, if the storing region of the ROM, in which the diagnostic program is pre-stored, is involved in any trouble, such an unfavorable situation occurs in that the diagnostic program itself might not correctly function causing a lack of reliability in diagnostic testing of the ROM.

Further, for are purpose of implementing a constant testing of the ROM, if diagnostic testing of the ROM is intermittently carried out with each of the separated regions thereof by interruption at a predetermined time cycle during the engine operation, it takes a long time for carrying out the diagnostic testing of the ROM (complete testing of the ROM by calculating the parity of the entire storing regions requires approximately 10 minutes). Therefore, if any trouble occurs in a portion of the ROM, which might result in a fatal defect of the entire ROM function, it is difficult to quickly detect such trouble of the ROM to thereby immediately diagnose and recover the trouble.

SUMMARY OF THE INVENTION

Therefore, an object of the present invention is to provide an improved technique for carrying out diagnostic testing of a ROM, i.e., a ROM not exclusively but preferably incorporated in a controlling microcomputer used in a vehicle-incorporated electronic controller, in which technique a redundant diagnostic testing program using first and second diagnostic testing programs is employed for executing the diagnostic testing of a ROM by enabling it to surely detect any trouble in any part of the storing region of the ROM storing therein one of the first and second diagnostic programs by the other diagnostic program stored in a different storing region of the, ROM to thusly enhance a reliability of diagnostic testing of the ROM compared with the above-described existing testing technique of a ROM.

Another object of the present invention is to provide an improved technique for carrying out a high speed diagnostic testing of a ROM, in which while one of the first and second diagnostic programs of the redundant diagnostic program is employed for implementing the diagnostic testing of the entire storing region of the ROM, the other one is employed for quickly implementing the effective diagnostic resting of a limited storing region of the ROM.

A further object of the present invention is to provide an apparatus for achieving the abovementioned respective objects.

A still further object of the present invention is to provide a method of carrying out the diagnostic testing of a ROM, which realizes the above-mentioned improved techniques.

In accordance with one aspect of the present invention, there is provided an apparatus for executing a diagnostic testing of a ROM to diagnose whether or not any trouble exists in the ROM, which comprises:

predetermined first and second diagnostic testing programs for the ROM stored in one and the other separate regions of a storing region of the ROM; and a processing unit for diagnosing the ROM on the basis of the predetermined first and second diagnostic testing programs, wherein the processing unit works to:

execute the diagnostic testing of at least the one region of the storing region that stores the second diagnostic testing program by the first diagnostic testing program; and, execute the diagnostic testing of at least the other region of the storing region that stores the first diagnostic testing program by the second diagnostic testing program.

In accordance with another aspect of the present invention, there is provided a vehicle-mounted diagnostic testing apparatus for executing a diagnostic testing of a ROM by the use of a central processing unit (CPU) to diagnose whether or not any trouble exists in the ROM, on the basis of a diagnostic testing program, wherein the ROM preliminarily stores first and second diagnostic testing programs in different storing regions thereof, respectively; and initially stores at east either one of a control program and data to be used for controlling an electrically-controlled throttle valve of a vehicle-engine in one of the different storing regions that stores the second diagnostic testing program; and wherein the CPU:

executes diagnostic testing of at least the one storing region that stores the second diagnostic testing program, on the basis of the first diagnostic testing program;

further executes diagnostic testing of at least the other storing region that stores the first diagnostic testing program, on the basis of the second diagnostic program; and turns a power source of the electronically-controlled throttle valve off when the result of the diagnostic testing indicates that any trouble exists in the ROM.

In accordance with a further aspect of the present invention, there is provided a method of executing a diagnostic testing of a ROM on the basis of a diagnostic testing program for the ROM to diagnose whether or not any trouble exists in the ROM, comprises:

storing predetermined first and second diagnostic testing programs for the ROM in separate storing regions of the ROM, respectively;

working the first diagnostic testing program to execute diagnostic testing of at least a storing region of the ROM that stores therein the second diagnostic testing program; and, working the second diagnostic testing program to execute diagnostic testing of at least a storing region of the ROM that stores them the first diagnostic program.

The above and other objects, features, and advantages of the present invention will be made more apparent by way of the following description of preferred embodiments with reference to the accompanying drawings.

BRIEF DESCRIPTION OF THE DRAWINGS

FIG. 2 is a schematic view illustrating an arrangement of programs and data within a ROM (Read Only Memory);

FIG. 3 is a schematic view illustrating an arrangement of JOB; and,

FIG. 4 is a schematic flow chart of a diagnostic testing of a ROM.

DESCRIPTION OF THE PREFERRED EMBODIMENT

Figure 1:
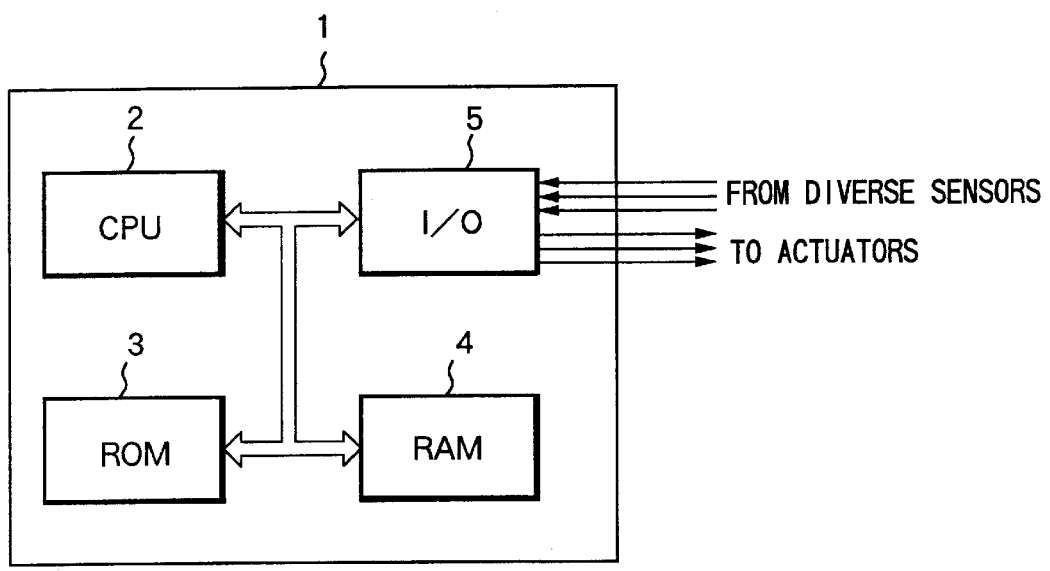
FIG. 1 is a schematic block diagram generally illustrating the construction of a controlling microcomputer for a vehicle electronic controller.

The description of a preferred embodiment of the present invention with reference to the accompanying drawings will be provided hereinafter for illustration only, and not for the purpose of limiting the invention as defined by the appended claims and their equivalents.

In the described embodiment of the present invention, the afore-described first ROM diagnostic testing program is used for executing diagnostic testing of the entire storing region of the ROM, i.e., for executing an ordinary diagnostic testing, and the aforedescribed second ROM diagnostic testing program is used for executing diagnostic testing of one specified storing region of the ROM, which includes a region storing therein the first ROM diagnostic testing program, i.e., for executing a high speed ROM diagnostic testing. Thus, in the description below, the first ROM diagnostic testing program will be referred to as au ordinary ROM diagnostic testing program, and the second ROM diagnostic testing program will be referred to as a high-speed ROM diagnostic program.

Referring to FIG. 1, a microcomputer 1 includes therein a CPU, a nonvolatile ROM 3, a volatile RAM 4, and an Input/Output 5 (I/O) for inputting data from and outputting data to various sots of sensors and actuators.

In the above-described microcomputer 1, the ROM 3 stores therein an operating system (OS) that is a JOB calling potion, diverse kinds of control programs including a program for controlling the fuel injection of an engine, a program, for controlling the ignition timing of the engine, and a program for controlling the electrically controlled throttle valve of the engine, diverse lads of controlling data including control constants and table data, a library that is a general-purpose subroutine including e.g., an interpolation operation subroutine used at the time of referring to the table, the ordinary ROM diagnostic testing program, the high-speed ROM diagnostic testing program, and respective ROM diagnostic testing sum/parity (expectation).

FIG. 2 illustrates an arrangement of the abovedescribed programs and the various data stored in the ROM 3.

As illustrated in FIG. 2, the ROM 3 has one specified storing region, for example, a storing region extending from frontmost address though a predetermined address, in which the OS, i.e., the JOB calling portion, the library, i.e., the general-purpose subroutine, the ordinary ROM diagnostic testing program, and the sum/parity for the ordinary ROM diagnostic testing are concentratedly arranged and stored. The ROM 3 has a further storing region separate from the above-mentioned specified region, which stores and suitably arranges the afore-described diverse bids of control programs, the diverse kinds of control data, the high-speed ROM diagnostic testing program, and the summary for the high-sped ROM diagnostic testing.

In the described arrangement of the diverse programs and data in the ROM 3, the ordinary ROM diagnostic testing program is provided for executing the diagnostic testing of the entire storing region of the ROM. Thus, the diagnostic testing of the entire storing region of the ROM includes the diagnostic testing of the storing region that stores therein the high-speed ROM diagnostic testing program and the sum/parity for the high-speed ROM diagnostic testing.

On the other hand, the high-speed diagnostic testing program is provided for executing the diagnostic testing of de specified one storing region of the ROM, in which the OS, i.e., the JOB calling portion the library, i.e., the general-purpose subroutine, the ordinary ROM diagnostic testing program, and the sum/parity for the ordinary ROM diagnostic testing are stored.

As will be understood from the foregoing description, in the diagnostic testing apparatus for a ROM of the present embodiment, the diagnostic testing of a ROM is intentionally made redundant by the employment of the two ordinary and high-speed ROM diagnostic testing programs thereby permitting each of the two programs to mutually monitor the execution of the opposite program. Therefore, if one of the two ordinary and high-speed diagnostic testing programs for a ROM has any trouble or is damaged, the other is able to detect the trouble of the opposite program, and accordingly an increase in the reliability of the diagnostic testing of a ROM is ensured. Further, although one of the above-mentioned two opposite diagnostic testing programs for a ROM executes the diagnostic testing of the storing region of the ROM, the other opposite diagnostic testing program effectively executes the diagnostic testing of only the specified storing region. Therefore, the speed-up of the diagnostic testing of the ROM can be achieved with certainty.

Referring now to FIG. 3 illustrating the JOB construction in the ROM, the OS that is the JOB calling portion execute a given processing at every 1 millisecond (1 ms) as a 1 ms JOB. The front of the 1 ms JOB executed by the OS is provided with an entry portion (the calling portion) of the ordinary ROM diagnostic testing, and calling the ordinary ROM diagnostic testing program to execute it as diagnostic testing application JOB (the Background JOB; BG-JOB) once during ten times (i.e., at every 10 milliseconds: 10 ms) counted by a counter incorporated in the OS. However, in the ordinary ROM diagnostic testing, the operation is exeuted by every one JOB about a predetermined storing region. Therefore, it takes approximately ten minutes for finally conducting the diagnostic testing of the ROM after completion of the operations with reference to the entire storing region of the ROM.

At the final stage of the 1 ms JOB by the OS, there is provided an entry portion (the JOB cling portion) of the high-speed ROM diagnostic testing, which calls the high-speed ROM diagnostic testing program to execute it as 10 ms JOB once during ten times (every 10 milliseconds) counted by the counter incorporated in the OS. In the high-speed ROM diagnostic testing, the operation is executed by every one JOB about a predetermined storing region with respect to the afore-mentioned specified storing region. However, since the operation is executed about only the specified storing region of the ROM, it takes approximately only 200 milliseconds (10 ms×20 times) to finally conduct the diagnostic testing of the ROM after completion of the operations with respect to the specified storing region of the ROM.

It should be understood that an entry portion for the controlling of fuel injection, an entry portion for the controlling of ignition timing, and an entry portion for the controlling of the electrically controlled throttle valve are arranged between the front end entry portion for the ordinary ROM diagnostic testing and the end entry portion for the high-speed ROM diagnostic testing, as best shown in FIG. 3.

If the JOB construction works in such a manner that both ordinary and high-speed ROM diagnostic testings are called for by one identical entry portion, a single trouble (e.g., application JOB abnormality) will cause such a condition that both of the ordinary and high-speed ROM diagnostic testing programs cannot work and as a result, the diagnostic testing apparatus for a ROM cannot execute even detection of the above-mentioned single trouble in the ROM. To prevent this condition, the two JOBs are separately arranged so that the ordinary ROM diagnostic testing and the high-speed ROM diagnostic testing are separately executed by respective of the two JOBs. Moreover, the entry portions for the respective JOBs are arranged at the frontmost and endmost processes that are executed by the OS, respectively.

The description of the ordinary and high-speed ROM diagnostic testing programs will be provided hereinafter the reference to the schematic flow chart of FIG. 4.

At this stage, it should be noted that although the ordinary and highspeed ROM diagnostic testing programs are separate programs, the basic flows of theses two programs are similar to one another. Thus, the description will be provided separately by using the same flow chart.

(The case of the Ordinary ROM Diagnostic Testing Program)

Referring to FIG. 4, at the step S1, an operation range for the sum/parity for one JOB is set. Since the ordinary ROM diagnostic testing is executed so as to test the entire storing region of the ROM, one JOB part from the frontmost address of the ROM is set as an operation range at the start (the fist time) of the diagnostic testing, and every subsequent one JOB part is sequentially set as an operation range for every times after the second time.

At the step S2, given bytes of, for example, four bytes of data are read with regard to the one JOB part set at the step S1, and the adding operation by the equation of SUM=SUM+four bytes is sequentially conducted to obtain the value SUM of the sum.

At the step S3, similarly, four bytes of data are read with regard to the one JOB part set at the step S1, and an exclusive OR operation is sequentially conducted by the formula of PTY=XOR (PTY, four byte data) to obtain the value PTY of the parity.

At the step S4, a decision is conducted to detect whether or not the sum/parity operation of all of the operation ranges (the entire storing region of the ROM) of the ordinary ROM diagnostic testing has been completed, i.e., whether or not the sum/parity operation of the front to the end addresses of the ROM has been completed. If no, the flow of this time is terminated.

When the sum/parity operation of all of the operation ranges (the entire storing region of the, ROM) of the ordinary ROM diagnostic testing has been completed, the flow is forwarded to the step S5.

At the step S5, a checking of the value of the sum is conducted. That is to say, the calculated value SUM of the sum is compared with the expectation SUM 1# of the sum that is preliminary calculated as the value of the sum for the entire region of the ROM and stored in a predetermined address of the ROM. When the coincidence is obtained as a result of the above comparison, the flow is forwarded to the step S6.

At the step S6, a checking of die value of the parity is conducted. Namely, the calculated value PTY of the parity is compared with the expectation PTY 1# of the parity that is preliminarily calculated as the value of the parity for the entire region of the ROM and stored in a predetermined address of the ROM, When the coincidence is obtained as a result of the above comparison, the flow is terminated based on the fact the rest of the diagnostic testing of the ROM is OK.

On the contrary, either when no coincidence is obtained from the comparison of the calculated value SUM of the sum with the expectation SUM 1# of the sum at the decision step S5 or when no coincidence is obtained from the comparison of the calculated value PTY of the parity with the expectation PTY 1# of the parity at the decision step S6, the flow is forwarded to the step S7 to decide that the diagnostic testing of the ROM is not good (NG). Thereafter, the process of the diagnostic testing process of the ROM is transferred to the fail-safe process due to the fail-safe program.

As one typical fail-safe process, the power source for a given device, i.e., the controlled object is turned off. For example, with respect to the economic controller for the electrically rolled throttle valve, a relay in the power source circuit of a drive motor or the electrically controlled throttle valve is turned off. When the relay is turned off, the electrically controlled throttle valve is moved to and fixed at a fail-safe degree of opening which is a relative small degree of opening by the operation of its return spring so that the engine output power is prevented from increasing but is permitted to perform a limp-home driving of a vehicle. Alternately, the fail-safe process might be executed by the resetting of the microcomputer, the lighting of an alarm lamp and so on.

(The Case of the High-speed ROM Diagnostic Testing Program)

Referring again to FIG. 4, at the step S1, an operation range for the sum/parity for one JOB is set. Although the high-speed ROM diagnostic testing is performed to test only single diagnostic range consists of one specified storing region of the ROM, the tested storing region begins from the frontmost address. Therefore, at the start of the diagnostic testing process, i.e., at the diagnostic testing of the first time, one JOB of region from the frontmost address of the ROM is set as an operation range, and every subsequent JOB of region of the ROM is sequentially set as each operation range after the diagnostic testing of the second time.

At the step S2, like as the afore-described step S2, every four bytes of data is read for every one JOB of operation range to subsequently conduct the adding operation for obtaining the value SUM of the sum.

At the step S3, like as the afore-described step S3, four bytes of data is read for every one JOB of operation range to subsequently conduct the exclusive OR operation for obtaining the value PTY of the parity.

At the step S4, a decision is conducted to detect whether or not the sum/parity operation of the whole operation range of the high-speed diagnostic testing (the specified storing region of the ROM) has been completed, i.e., whether or not the sum/parity operating of the frontmost through the end-most addresses of the operation range has been completed. If no, the flow of this time is terminated.

When the sum/parity operation of the whole operation range (the specified one storing region of the ROM) of the high-speed ROM diagnostic testing is completed, the flow is forwarded to the step S5.

At the step S5, a checking of the value of the sum is conducted. That is to say, the calculated value SUM of the sum is compared with the expectation SUM 2# of the sum that is preliminarily calculus as the value of the sum for the specified one region of the ROM and stored in a predetermined address of the ROM. When the coincidence is obtained as a result of the above comparison, the flow is forwarded to the step S6.

At the step S6, a checking of the value of the parity is conducted. Namely, the calculated value PTY of the parity is compared with the expectation PTY 2# of the parity that is preliminarily calculated as the value of the parity for the specified one region of the ROM and stored in a predetermined address of the ROM. When the coincidence is obtained as a result of the above comparison, the flow is terminated based on the fact the result of the diagnostic testing of the ROM is OK.

On the contrary, either when no coincidence is obtained from the comparison of the calculated value SUM of the sum with the exceptation SUM 2# of the sum at the decision step S5 or when no coincidence is obtained from the comparison of the calculated value my of the parity with the expectation PTY 2# of the parity at the decision step S6, the flow is forwarded to the step S7 to decide that the diagnostic testing of the ROM is not good (NG). Thereafter, the process of the diagnostic testing process of the ROM is transferred to the fail-safe process due to the fail-safe program.

From the foregoing description of the embodiment of the present invention, it will be understood that with the programs and the data stored in a ROM, some of them, which will cause any important trouble if any abnormality appears in the storing region of such programs and data are concentratedly arranged in one specified storing region of the ROM. More specifically the arrangement of the JOB calling portion (the OS), the general-purpose subroutine (the library), and the ordinary ROM diagnostic testing program selected from the diverse programs and data in the ROM are concentrated to the one specified storing region of the ROM to thereby allow the high-speed ROM diagnostic testing program to conduct the diagnostic testing of only that specified region of the ROM. Further, the above-mentioned programs and data which will cause any important trouble if any abnormality appears may includes a basic program and the related data which are indispensable for the diagnostic testing of the ROM. It will now be understood from the foregoing that the important region of the ROM can be diagnostically tested during a short time period while extremely reducing the operation load.

Moreover, in the case where the diagnostic testing of a ROM is executed by the sum/parity diagnostic format, when the expectation of the sum/parity, which is referred to by one of the ROM diagnostic testing program (the ordinary and high-speed ROM diagnostic testing programs) is stored in a region diagnostically tested by the other of the diagnostic testing programs, the function of the diagnostic testing cannot be lost or degraded due to an abnormality of the sum/parity that is preliminarily calculated and stored in the ROM.

At this stage, it should be understood that the sum/parity diagnostic format is a format for executing the diagnostic process by the use of at least either one of the sum and the parity.

This application claims priority to Japanese Patent Application NO. 2000-284133, and accordingly the entire disclosure of Japanese Patent Application NO. 2000-284133 is hereby incorporated herein by reference.

In the foregoing, only selected embodiment has been chosen to describe and illustrate the present invention, it will be apparent to those skilled in the art from the disclosure that variations and modifications can be made without departing from the scope of the invention as defined in the appended claims. Further, the foregoing description of the embodiment of the present invention are provided for illustration only, and not for the purpose of limiting the invention as defined by the appended claims and their equivalents.

I claim:

1. An apparatus for executing a diagnostic testing of a ROM to diagnose whether or not any trouble exists in the ROM, comprising:

predetermined first and second diagnostic testing programs for the ROM stored in one and the other separate regions of a strong region of the ROM; and a processing unit for diagnosing the ROM on the basis of the predetermined first and second diagnostic testing programs, wherein the processing unit works to:

execute the diagnostic testing of at least the one region of the storing region that stores the second diagnostic testing program by the first diagnostic testing program; and, execute the diagnostic testing of at least the other region of the storing region that stores the first diagnostic testing program by the second diagnostic testing program.

2. The apparatus as set forth in claim 1, wherein said processing unit:

firstly executes the diagnostic testing of an entire region of the storing region of said ROM by the use of the first diagnostic testing program, and secondly executes the diagnostic testing of one specified region of the storing region of the ROM including the other region of the storing region that stores the first diagnostic testing program by the use of the second diagnostic testing program.

3. The apparatus as set forth in claim 2, wherein with programs and data stored in the ROM, preselected programs and data that might cause an important trouble if any abnormality appears in a storing region of the ROM that stores the preselected programs and data are concentratedly arranged in the one specified storing region of the ROM, and the second diagnostic testing program executes diagnostic resting of only the one specified storing region of the ROM.

4. The apparatus as set forth in claim 3, wherein the preselected programs and data are basic programs for operating the first and second diagnostic testing programs and predetermined data associated with the basic programs.

5. The apparatus as set for in claim 3, wherein the preselected programs and data that might cause an important trouble include at least one of a JOB calling portion, a general-purpose subroutine, and the first diagnostic testing program for the ROM.

6. The apparatus as set forth in claim 2, wherein the storing region of the ROM that is diagnostically tested by the second diagnostic testing program includes a storing region of the ROM that stores JOB calling portion and generic-purpose subroutine.

7. The apparatus as set forth in claim 1, wherein the diagnostic testing executed by the first and second diagnostic testing programs are a sum/parity format, respectively, and an expectation of the sum and parity referred to by one of the both diagnostic testing programs is stored in a storing region that is diagnostically tested by the other of the both diagnostic testing programs.

8. The apparatus as set forth in claim 1, wherein the first and second diagnostic testing programs are arranged at separate JOB.

9. A vehicle-mounted diagnostic testing apparatus for executing a diagnostic testing of a ROM by the use of a central processing unit (CRU) to diagnose whether or not any trouble exists in the ROM, on the basis of a diagnostic testing program, wherein the ROM preliminarily stores first and second diagnostic testing programs in different storing regions thereof, respectively; and additionally stores at least either one of a control program and data to be used for controlling an electronically-controlled throttle valve of a vehicle-engine in one of the different storing regions that stores the second diagnostic testing program; and wherein the CPU:

executes diagnostic testing of at least the one storing region that stores the second diagnostic testing program, on the basis of the first diagnostic testing program;

further executes diagnostic testing of at least the other storing region that stores the first diagnostic testing program, on the basis of the second diagnostic program; and turns a power source of the electronically-controlled throttle valve off when the result of the diagnostic testing indicates that any trouble exists in the ROM.

10. A method of executing a diagnostic testing of a ROM on the basis of a diagnostic testing program for the ROM to diagnose whether or not any trouble exists in the ROM, comprising the steps of:

storing predetermined first and second diagnostic testing programs for said ROM in separate storing remains of said ROM, respectively;

working said first diagnostic testing program to execute diagnostic testing of at least a storing region of said ROM that stores therein said second diagnostic testing program; and, working said second diagnostic testing program to execute diagnostic testing of at least a storing region of said ROM that stores therein said first diagnostic program.

* * * * *